Patented Dec. 11, 1945

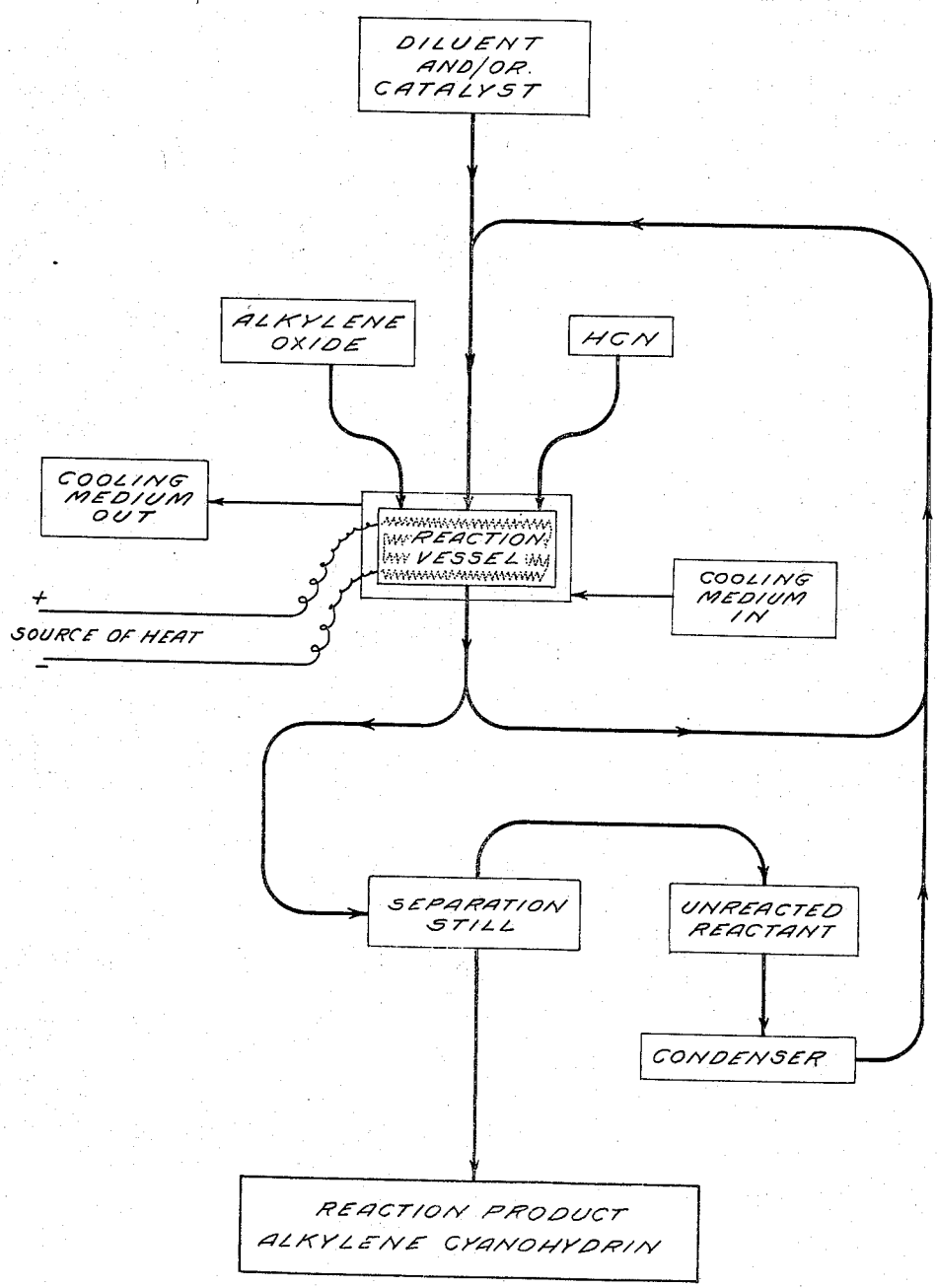

2,390,519

UNITED STATES PATENT OFFICE 2,390,519

PREPARATION OF ALKYLENE CYANOHYDRINS

Harold S. Davis and Bryan C. Redmon, Riverside, Conn., assignors to American Cyanamid Company, New York, N. Y., a corporation of Maine Application February 16, 1939, Serial No. 256,676

13 Claims. (Cl. 260—464)

The present invention relates to a method of making alkylene cyanohydrins from the corresponding alkylene oxide and hydrocyanic acid, in the liquid phase.

The reaction using ethylene oxide as a typical starting material may be written as follows:

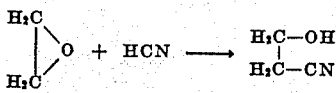

Inasmuch as the boiling point, at atmospheric pressure, of ethylene oxide is 10.7° C., that of HCN is 26° C., and that of ethylene cyanohydrin is 220° C., and since the operating temperatures are much above the boiling point of the reactants, it is, therefore, necessary to allow the reaction to proceed in closed systems under pressure due to the high vapor pressures of the initial reactants at the operating temperatures.

The prior art indicates that the reaction is a slow one. Erlenmeyer (Liebig's Annalen 191,261, (1878)) reports a 0 yield at 25° C. in closed tubes after eight days, but a good yield at 50° to 60° C. after four days. No further definition as to yields is mentioned by this experimenter.

The principal object of the present invention, therefore, is to discover ways and means for reacting the alkylene oxides and hydrocyanic acid so that commercial yields are obtainable in simple apparatus in much shorter periods of time.

Using ethylene oxide as an example, simply because the prior art literature deals with this reactant in the preparation of ethylene cyanohydrin and because of its cheapness and availability, it has now been determined that at higher temperatures than those heretofore described, a spontaneous, rapid and highly exothermic reaction occurs with HCN to form ethylene cyanohydrin in good yields if equi-molecular mixtures of the reactants are heated under pressure to within an activation temperature range in which the reaction starts spontaneously. Once started, the reaction has been observed to proceed under its own power at a velocity depending principally upon the extent of the dilution of the reactants in certain solvents. When the reaction is spontaneously under way, it is no longer necessary to supply heat to the system unless the reaction has been caused to proceed very slowly.

The heat of reaction has been calculated from the known heats of formation of HCN and ethylene oxide and from an estimated value for ethylene cyanohydrin. The heat of reaction so calculated was found to be between +40,000 and +50,000 calories per mol of liquid ethylene cyanohydrin formed from liquid reactants. This corresponds to from 550 to 700 calories per gram.

If no diluent is present and no heat lost to the container or surroundings, the heat of reaction will raise the reaction product to a point substantially in the neighborhood of 1000° C. above the activation temperature with a corresponding pressure increase. It has been found that such high temperatures very seriously impair the yields due to destruction of the product and possibly of the initial reactants through pyrolysis and polymerization. It is, therefore, a matter of the utmost importance to avoid excessive temperature rises during the reaction. This may be accomplished by controlling the reaction velocity so that sufficient time is permitted for heat dissipation, carrying out the reaction in an apparatus designed to conduct the heat away quickly and efficiently or dissolving the reactants in a suitable solvent which decreases the reaction velocity and assists in heat dispersion, or combinations of the above.

It is, of course, equally disadvantageous to allow the temperature of the reaction to fall much below the activation range since this either stops the reaction completely or slows up its velocity undesirably. Therefore, a temperature somewhat above the minimum activation temperature should be maintained as closely as possible. While the exact value of these temperatures will depend upon the conditions of the reaction and the design of the apparatus, in general it may be said that the activation temperature lies between the limits of 90° C. and 150° C. and, consequently, for efficient operation, temperatures should be maintained well within these limits.

If the undiluted equi-molecular mixtures of alkylene oxide and HCN are heated particularly to the upper limits of the activation temperature range, the reaction velocity is explosive in character. Perhaps the simplest way of dampening this velocity is by the use of diluents. Consequently, a large number of liquid diluents were studied in order to discover a liquid which would most effectively dissipate the heat of reaction and, therefore, eliminate sudden and large increases in temperature and pressure. It may be generally said that solvents of which a mixture of diphenyl oxide and diphenyl with a boiling point of substantially 250° C. to 260° C., and ethylene glycol are typical have not been found to be of value. Solvents of the polar type, however, such as water, ethylene cyanohydrin and the liquid reaction product of a previous run, have a very marked effect in rendering the velocity of the reaction controllable. Water, however, has the disadvantage of promoting the corrosion of steel by HCN where the reaction is carried out in apparatus including that material. However, the use of the more resistant alloy steels under these circumstances will be desirable in view of the cheapness of this diluent.

When a quantity of the liquid product from a previous run was used as a diluent, the amazing discovery was made that it was possible to start the reaction at rather low activation temperatures, and to control the reaction velocity over wide ranges by merely varying the concentration of the reactants. The use of ordinary or commercial alkylene cyanohydrins in this manner also tended to produce the same results, although not to such a favorable degree. It may be, therefore, that the reaction product contains a certain amount of polymerization products or side reaction products or even unreacted starting materials which act as catalysts, although obviously we do not wish to be limited to such a theory.

In this connection, reference is had to the following data. In all cases, the concentration of the reactants is based upon the weight percentage of the equi-molecular mixture of the reactants in the total weight of solution.

TABLE I
Reactions in glass bombs
[Water as diluent]

| Conc. of reactants | Catalyst | Activation temp. | Pressure at act. temp. | Highest temp. | Temp. increase | Highest pressure | Time of reaction | Yield |
|---|---|---|---|---|---|---|---|---|
| Per cent | | ° C. | Lbs./sq. in. | ° C. | ° C. | Lbs./sq. in. | Minutes | Per cent |
| 100 | None | | | 110 | | | | [1] 0 |
| 100 | do | 150 | 500 | | | | | [2] 0 |
| 66⅔ | do | 125-130 | 150-210 | 165 | 35-40 | 360 | 10-15 | 74.1 |
| [3] 66⅔ | do | 132 | 240 | | | Ca. 750 | | [2] 0 |
| 66⅔ | CaO | 108 | 120 | 138 | 30 | 240 | 10 | 78.1 |
| 66⅔ | None | 124 | 240 | 152 | 28 | 480 | 10-15 | 81.9 |

[1] No reaction after 3 hours and 10 minutes.
[2] Explosion.
[3] Used pure distilled HCN and ethylene oxide.

In Table I above, it is to be noted that with the exception of the fourth run, the HCN used was a 98% product and contained some HCN polymer as evidenced by its yellow color. It would seem, therefore, that even the small amount of polymer present in the commercial HCN used renders the reaction more controllable. Compare runs 3 and 4 for this effect.

In run 2, it is concluded that the absence of a diluent caused loss of control after the reaction was initiated and the apparatus exploded.

TABLE II
Reactions in steel bomb
[Water as diluent]

| Conc. of reactants | Catalyst | Activation temp. | Pressure at act. temp. | Highest temp. | Temp. increase | Highest pressure | Yield |
|---|---|---|---|---|---|---|---|
| Per cent | | ° C. | Lbs./sq. in. | ° C. | ° C. | Lbs./sq. in. | Per cent |
| 50 | None | 123 | <100 | 168 | 45 | 200 | [1] <25 |

[1] Large amount of HCN polymer.

TABLE III
Reactions in glass bombs
[Commercial ethylene cyanohydrin as a diluent]

| Conc. of reactants | Activation temp. | Pressure at act. temp. | Highest temp. | Temp. increase | Highest pressure | Time of reaction | Yield |
|---|---|---|---|---|---|---|---|
| Per cent | ° C. | Lbs./sq. in. | ° C. | ° C. | Lbs./sq. in. | Minutes | Per cent |
| 10 | 130 | 32 | 132 | 2 | 32 | 30-35 | <25 |
| 17.2 | 128 | 75 | 136 | 8 | 75 | 10-15 | 73 |
| 33.3 | 115 | 68 | 130 | 15 | 83 | 5-10 | 55 |
| 50.0 | 108 | 150 | | | >300 | [1] | |

[1] Explosion.

TABLE IV
Reactions in steel bomb
[Commercial ethylene cyanohydrin as a diluent]

| Conc. of reactants | Activation temp. | Pressure at act. temp. | Highest temp. | Temp. increase | Highest pressure | Time of reaction | Yield |
|---|---|---|---|---|---|---|---|
| Per cent | ° C. | Lbs./sq. in. | ° C. | ° C. | Lbs./sq. in. | Minutes | Per cent |
| 20 | 112 | 58 | 122 | 10 | 63 | Ca. 25 | 80 |
| 25 | 118 | 70 | 134 | 16 | 85 | Ca. 8 | 80 |
| 34 | 118 | <100 | 141 | 23 | <100 | Ca. 5 | 38-51 |
| 50 | 110 | <100 | 164 | 54 | 800 | Ca. 3 | 0 |

These data show generally that in the apparatus used, the reaction rate is the fastest and the temperature and pressure increases are the greatest in solutions containing the largest concentrations of reactants, and, correspondingly, as the concentration is decreased, the reaction velocity and hence the temperature and pressure increases are diminished. It is also at once apparent that the most rapid reactions, giving rise to higher temperatures, give lower yields than the slower reactions. This phenomenon may be ascribed to the destruction of the product at higher temperatures, which is confirmed by the large amounts of polymer and undistillable substances left on distilling the product. In general, the activation temperatures decrease with increasing concentrations in glass, but in steel this effect is not generally noticeable. It seems probable that the presence of iron lowers the activation temperatures in all cases since one reaction in glass showed a decrease of 18° C. (128° to 110° C.) in the activation temperature when the reaction was carried out in the presence of iron wires. A decrease in activation temperature is also always accompanied by a decrease in the highest temperature and pressure attained in the reaction, so that iron may be said to have a beneficial effect.

In any case, the initial activation temperatures lie between 100 and 120° C. in all concentrations tried in steel.

Other substances also seem to act catalytically to lower the activation temperature. The fact that such catalysts include pyridine, amines, HCN polymer, ammonia, alkali-forming metal oxides and hydroxides, while acidic substances retard the reaction indicates that any material which will catalyze the polymerization of HCN will also catalyze the present reaction. The same is true for retarders. Thus calcium oxide will catalyze both reactions while metallic copper retards it. This leads to the conclusion that the presence of $CN^-$ ion is believed to be necessary if the reaction is to proceed. The existence of this ion is indicated in the presence of bases and water. The absence of $CN^-$ ion in the presence of acids, due to the repression of ionization of HCN may explain the negative effect of acids, and the removal of $CN^-$ ions due to formation of complex ions of copper and $CN^-$ may explain the negative effect of metallic copper.

The foregoing data also show that the best yields yet attained with cyanohydrin as diluent were 80% and these were obtained in 20-25% solutions. These concentrations were optimum where no particular attempt was made to dissipate the heat of reaction from the apparatus. A concentration of 25%, therefore, may be exceeded where means are provided to abstract rapidly the reaction heat.

Runs were carried out to investigate the effect of recycling, using the reaction product from each run as a solvent for the next run without any intermediate treatment. In two series of such runs, 20% solutions were reacted in a steel bomb. Three and two cycles were run so that the percentage composition of the mixtures was substantially the same. The following data were collected:

TABLE V

[20% mixtures on recycling]

| Activation temp. | Pressure at act. temp. | Highest temp. | Highest pressure | Reaction time | Yields |
|---|---|---|---|---|---|
| °C. | Lbs./sq. in. | °C. | Lbs./sq. in. | Minutes | Per cent |
| 112 | 58 | 122 | 63 | Ca. 25 | |
| 98 | 45 | 112 | 58 | Ca. 12 | 80 |
| 96 | 45 | 108 | 54 | Ca. 8 | |
| 107 | 47 | 114 | 52 | Ca. 26 | 80 |
| 97 | 42 | 110 | 55 | Ca. 14 | |

It is apparent from an inspection of Table V that some substance present in the product exerts a marked effect in lowering the activation temperature. Hence, the maximum temperatures and pressures attained are decreased in reactions when the product from one run is used without further treatment as the solvent for the next run. Such conditions would be encountered in recycling. It should also be pointed out that in each successive run or cycle the reaction velocity becomes more rapid (about 100% faster each cycle) although the temperatures and pressures are lower.

The following pertinent facts concerning the reaction may be outlined:

1. The reaction is spontaneous and exothermic when the reactants are heated to a suitable activation temperature, that is, above 90° C.
2. Once started, the reaction will proceed rapidly, depending upon dilution and if without heat dissipation, the temperature may rise above 150° C. which is undesirable.
3. Where the concentration of reactants is between 15% and 50%, in a suitable diluent, the reaction proceeds smoothly with good yields.
4. The entire desirable temperature range over which the reaction takes place is controllable by choice of reactant dilution and/or heat dissipation.
5. Substances exerting an alkaline effect and/or permitting the formation of $CN^-$ ions lower the activation temperature of the reaction. Some such substances are:

Water
Alkylene cyanohydrin
The liquid product of a previous run
Alkali-forming metal oxides
Alkali-forming metal hydroxides
Pyridine
Amines
Ammonia
HCN polymer
Fe 6. A catalyst is produced during the reaction which lowers the activation temperature for the next cycle, and increases the speed of the reaction without higher temperatures.
7. The reaction proceeds in steel, which is somewhat catalytic, without undue corrosion.

In substantially the same manner, other alkylene cyanohydrins may be prepared from their corresponding oxides.

TABLE VI

Reaction in glass bomb

[Propylene oxide, HCN with water as diluent]

| Conc. of reactants | Activation temp. | Pressure of activation temp. | Temp. increase | Maximum pressure | Time of reaction | Yield |
|---|---|---|---|---|---|---|
| Per cent | °C. | Lbs./sq.in. | °C. | Pounds | Minutes | Per cent |
| 70 | Ca. 167 | 240 | 19 | 480 | 20 | 74.3 |

The product of this reaction was identified as propylene cyanohydrin most likely having the formula—

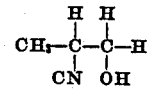

and the following physical constants:

Refractive index 1.4280 at 20.5° C.
Boiling point at 768 mm. 208° C.
Boiling point at 760 mm. 207° C.
Boiling point at 15 mm. 104° C.
Density 0.9942 at 20° C.

It is to be noted, however, that as the higher members of the series of oxides have longer carbon chains, the activation temperature of their reaction with HCN will increase correspondingly. In preparing such a cyanohydrin, the same general conditions as found for ethylene cyanohydrin have been observed.

All these factors point to the use of a continuous process in steel pressure apparatus for the manufacture of ethylene and other alkylene cyanohydrins.

Under the above circumstances, a continuous process for the production of alkylene cyanohydrins may be diagrammatically represented as in the accompanying flow sheet. As shown, a quantity of alkylene oxide and HCN in proper proportions and concentrations is fed to a reaction vessel together with a suitable quantity of a portion of the liquid reaction product and/or some other diluent and/or catalyst. Of course, the catalyst and/or diluent may be fed separately. The vessel is then closed and heated to the activation temperature. At this point, a cooling medium is supplied to maintain the temperature and pressure within optimum limits so as to obtain desirable yields. A portion of the reaction product together with unreacted reactants, if any, is then recycled with or without additions of a diluent and/or catalyst as indicated. The major portion of the contents of the reaction vessel are then passed to a separation still where the unreacted reactants, if any, are removed to give a reaction product of requisite quality.

While the invention has been described with particular reference to specific embodiments, it is to be understood that it is not to be limited thereto, but is to be construed broadly, and limited solely by the scope of the appended claims.

We claim:

1. A method of making alkylene cyanohydrin which includes the steps of reacting an alkylene oxide and HCN in liquid phase at a temperature greater than 90° C.

2. The method of claim 1 while abstracting the heat of reaction so as to maintain the reaction vessel at a temperature not greater than 150° C.

3. A method of making alkylene cyanohydrin which includes the steps of reacting an alkylene oxide and HCN in liquid phase at a temperature greater than 90° C. in which the reaction is carried out in the presence of alkylene cyanohydrin the latter being present in the proportion of from 34 to 82%.

4. A method of making alkylene cyanohydrin which includes the steps of reacting an alkylene oxide and HCN in liquid phase at a temperature greater than 90° C. in which the reaction is carried out in the presence of a quantity of the liquid reaction product of a previous run the latter being present in the proportion of from 34 to 82%.

5. A method of making ethylene cyanohydrin which includes the steps of reacting an ethylene oxide and HCN in liquid phase at a temperature greater than 90° C.

6. The method of claim 5 while abstracting the heat of reaction so as to maintain the reaction vessel at a temperature not greater than 150° C.

7. The method of claim 5 in which the reaction is carried out in the presence of a liquid chosen from the group consisting of water, ethylene cyanohydrin and the liquid product of a previous run the latter being present in the proportion of from 34 to 82%.

8. A method of making ethylene cyanohydrin which includes the steps of reacting an ethylene oxide and HCN in liquid phase at a temperature greater than 90° C. in which the reaction is carried out in the presence of ethylene cyanohydrin the latter being present in the proportion of from 34 to 82%.

9. A method of making ethylene cyanohydrin which includes the steps of reacting an ethylene oxide and HCN in liquid phase at a temperature greater than 90° C. in which the reaction is carried out in the presence of a quantity of the liquid reaction product of a previous run the latter being present in the proportion of from 34 to 82%.

10. A method of making an alkylene cyanohydrin which includes the steps of heating an alkylene oxide and HCN in liquid phase to an activation temperature in which the reaction starts spontaneously in which the concentration of reactants is from 15% to 50% in a diluent, the major portion of which is alkylene cyanohydrin.

11. A method of making an alkylene cyanohydrin which includes the steps of heating an alkylene oxide and HCN in liquid phase to an activation temperature in which the reaction starts spontaneously in which the concentration of reactants is from 15% to 50% in a diluent, the major portion of which is alkylene cyanohydrin, while abstracting the heat of reaction so as to maintain the temperature below 150° C.

12. A continuous process of making alkylene cyanhydrin, which includes the steps of feeding alkylene oxide and hydrocyanic acid to a reaction zone heated to from 90° C. to 150° C., together with the product of a previous run, drawing off the resultant cyanhydrin product, and recycling a portion thereof together with fresh quantities of alkylene oxide and hydrocyanic acid to the reaction zone.

13. A continuous process of making alkylene cyanhydrin, which includes the steps of feeding alkylene oxide and hydrocyanic acid to a reaction zone heated to from 90° C. to 150° C., together with the product of a previous run, drawing off the resultant cyanhydrin product, and recycling a portion thereof together with fresh quantities of alkylene oxide and hydrocyanic acid to the reaction zone, and passing the cyanhydrin product through a separation still to remove unreacted reactant, and collecting the thus purified alkylene cyanhydrin.

HAROLD S. DAVIS.
BRYAN C. REDMON.